May 8, 1956 M. T. FINCH 2,744,422
INFINITE RATIO SELECTOR
Filed May 24, 1952 7 Sheets-Sheet 1

INVENTOR.
Milton T. Finch.
BY
ATTORNEY.

May 8, 1956 M. T. FINCH 2,744,422
INFINITE RATIO SELECTOR
Filed May 24, 1952 7 Sheets-Sheet 2
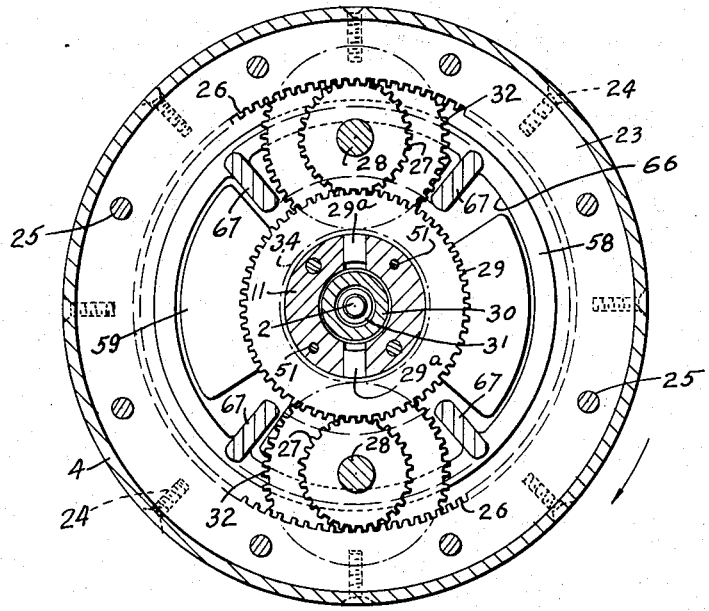
Fig. 2.
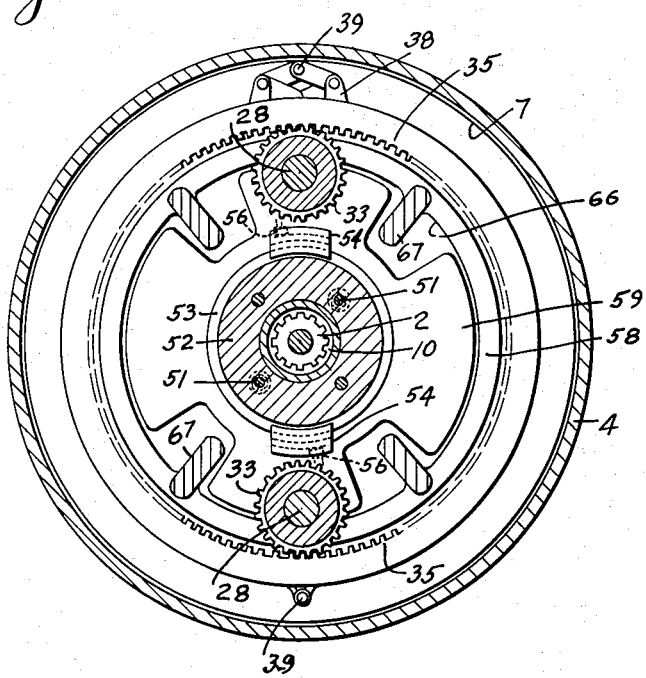
Fig. 3.
Fig. 13.
INVENTOR.
Milton T. Finch.
BY
ATTORNEY.

May 8, 1956  M. T. FINCH  2,744,422
INFINITE RATIO SELECTOR
Filed May 24, 1952  7 Sheets-Sheet 3
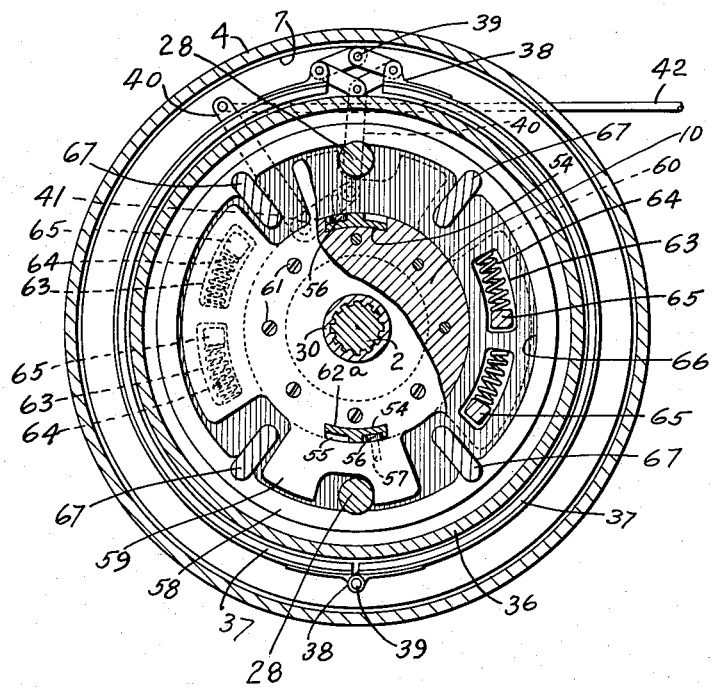
Fig. 4.
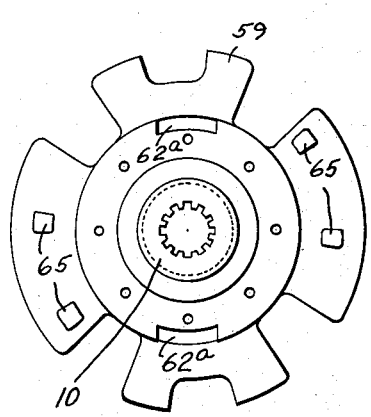
Fig. 8.
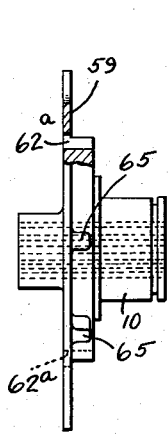
Fig. 9.
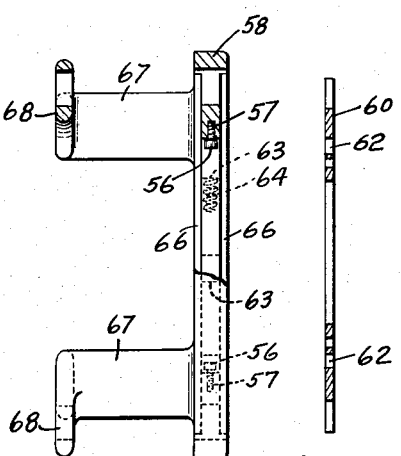
Fig. 10.  Fig. 11.
INVENTOR.
Milton T. Finch.
BY
ATTORNEY.

May 8, 1956 M. T. FINCH 2,744,422
INFINITE RATIO SELECTOR
Filed May 24, 1952 7 Sheets-Sheet 4
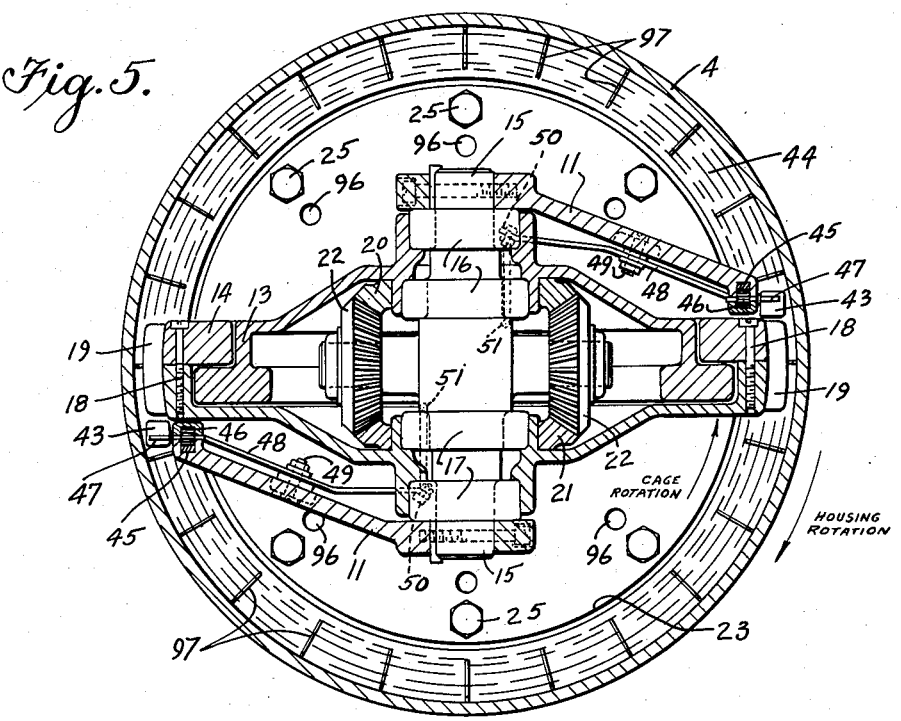
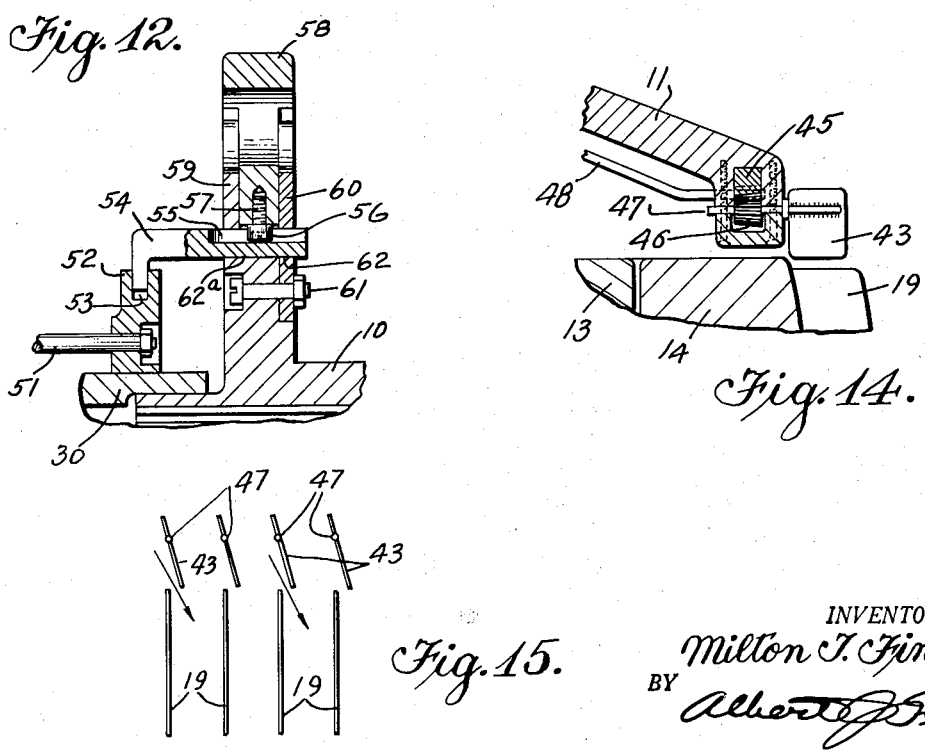
INVENTOR.
Milton T. Finch.
BY Albert J. Fike
ATTORNEY.

May 8, 1956    M. T. FINCH    2,744,422
INFINITE RATIO SELECTOR
Filed May 24, 1952    7 Sheets-Sheet 5

INVENTOR.
Milton T. Finch.
BY
Albert G. Fihe
ATTORNEY.

May 8, 1956  M. T. FINCH  2,744,422
INFINITE RATIO SELECTOR
Filed May 24, 1952  7 Sheets-Sheet 6

INVENTOR.
Milton T. Finch
BY
Albert J. Fihe
ATTORNEY.

United States Patent Office 2,744,422
Patented May 8, 1956

2,744,422

INFINITE RATIO SELECTOR

Milton T. Finch, Sunland, Calif.

Application May 24, 1952, Serial No. 289,749

14 Claims. (Cl. 74—751)

This invention relates to an infinite ratio selector and has for one of its principal objects the provision of a power transmission mechanism wherein the ratio of the speeds between the driving shaft and the driven shaft can be either manually or automatically controlled through practically an infinite range.

One of the important objects of this invention is to provide, in a power transmission mechanism, a pair of balanced rotors having gyroscopic action which, due to their resistance to shift from their common axis of revolution, will initiate and impart a controlled speed and power transmission between the driving and the driven shafts of the mechanism.

Another object is to provide, in combination with the aforesaid gyroscopic control, a system of sun and planet gears which are set into motion by the driving shaft and which, when actuated and controlled by way of the gyroscopic rotors, will accordingly transmit power in varying speed ratios to the driven shaft.

A further object of the invention is the provision, in a device of the class described, of means for conveniently and efficiently reversing the direction of rotation between the respective driving and driven shafts.

Yet another object is to provide, in an automatic power transmission mechanism capable of operation through a practically infinite speed range, means associated with the driving apparatus whereby an increase in load on the driven shaft will automatically produce a slowing down of the transmission mechanism, thereby providing an increased power transmission ratio whenever necessary.

Another and still further important object of the invention includes the provision of a series of vanes around the periphery of one of the rotors, whereby the speed of the same will be controlled by way of a hydraulic fluid directed against the vanes upon the passage of said hydraulic fluid through a series of adjustable vanes mounted in juxtaposed relationship to the peripheral vanes.

Other and further important objects of the invention will be apparent from the disclosures in the accompanying drawings and following specification.

The invention, in a preferred form, is illustrated in the drawings and hereinafter more fully described.

In the drawings:

Figure 2 is a vertical sectional view taken on the line 2—2 of Figure 1, looking in the direction indicated by the arrows.

Figure 3 is a sectional view taken on the line 3—3 of Figure 1, looking in the direction indicated.

Figure 4 is a section substantially on the line 4—4 of Figure 1.

Figure 5 is a section taken on the line 5—5 of Figure 1, showing particularly the gears and driving shaft of the gyroscopic rotors.

Figure 8 is a detail view showing the rear face of the plate-like control element of Figure 4.

Figures 9, 10 and 11 are separated portions of part of the operating structure illustrated in Figure 4.

Figure 12 is an enlarged view of a portion of the automatic control means incorporated into the structure best shown in Figure 4.

Figure 13 is an enlarged detail view showing a cam slot and cam which forms part of the aforesaid automatic control mechanism.

Figure 14 is a detail view showing a portion of the mechanism for changing the angle of direction of the adjustable control vanes.

Figure 15 is a diagrammatic showing of some of the vanes on the periphery of the main operating gyroscopic rotor and illustrating some of the control vanes in operative association therewith.

As shown in the drawings:

Figure 1:
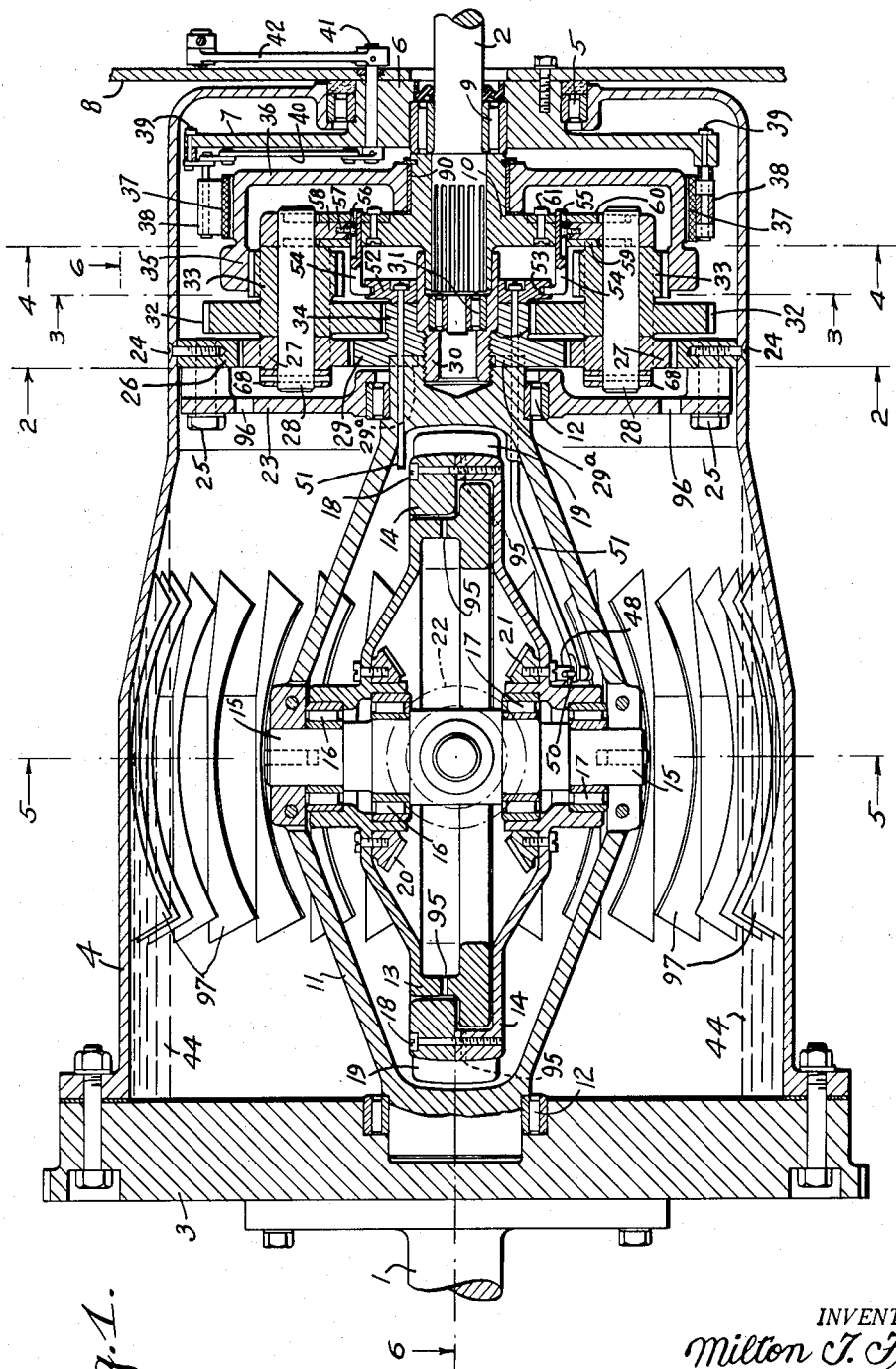
Figure 1 is a vertical sectional view of the infinite ratio selector power transmission mechanism of this invention, illustrating one form thereof.

The reference numeral 1 indicates generally the driving shaft of the improved infinite ratio selector mechanism of this invention and the reference numeral 2 indicates the driven shaft. Referring to Figure 1, the driving shaft 1 is fixed to a fly-wheel or the like 3, which in turn has bolted to its rear face a housing 4. This housing turns with the driving shaft and is provided with a bearing 5 in its rear face, which bearing is positioned in a boss 6 of a plate 7 positioned inside the housing. The boss and plate are mounted upon a support or bracket 8, which forms part of the equipment which supports the motor or engine, and which may be an automobile or some relatively fixed power installation.

The forward end of the driven shaft 2 is rotatably mounted in a bearing 9, which is positioned in the boss 6 and the end of the driven shaft 2 is splined so as to removably and slidably fit into a driving element 10, which forms part of the automatic transmission.

Mounted in the housing 4 and in alignment with the shafts 1 and 2 is a web-like support 11, rotatable in bearings 12. Fixed in the web-like support 11 is a pair of inter-fitted gyroscopic rotors 13 and 14. A supporting shaft 15 for the rotors is mounted transversely of the web-like support 11 and bearings 16 and 17 respectively are provided for the rotors themselves.

Figure 17:
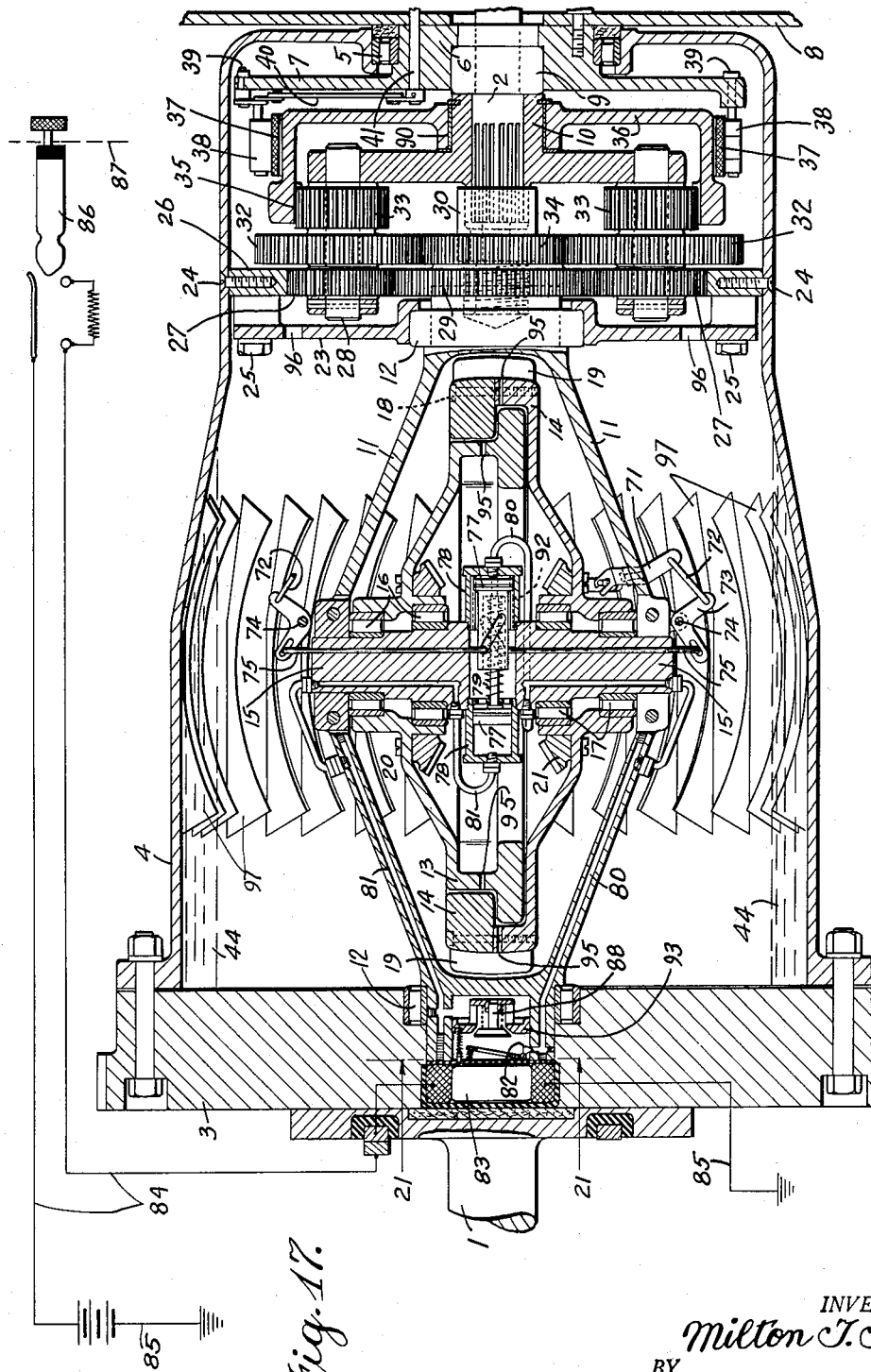
Figure 17 is a view somewhat similar to Figure 1, but illustrating in detail the manual speed control means which forms an important part of this invention. This differs from the automatic control of Figure 1.

The rims of the rotors are shaped as shown in Figures 1 and 17, and the rim of the outer rotor 14 is in two parts, held together by bolts 18, whereby ready assembly and disassembly is possible. A plurality of radial vanes 19 is mounted around the periphery of the outer rotor 14.

Beveled gears 20 and 21 respectively are affixed to the hubs of the gyroscopic rotors and these beveled gears inter-mesh with corresponding beveled gears 22 (Figure 5) whereby rotation of the outer rotor 14 imparts a similar rotation to the inner one.

A plate-like element 23 supports the bearing 12 for the rear end of the web-like cage 11 for the rotors.

Bolts 25 fitted around the periphery of the plate element 23 connect this element to an internal gear 26, the external diameter of which is the same as the internal diameter of the housing 4 at that point. This internal gear is connected to the housing by means of bolts 24 (Figure 2).

Two planetary gears 27, supported on shafts 28, are in mesh with the internal gear 26 and are also in mesh with a sun gear 29, which in turn is fixedly mounted on a cap-screw 30, which is also fixed into a corresponding recess in the rear face of the cage 11. The sun gear 29 is secured to the cage 11 by the cap-screw 30. See details in Figure 2, the gear 29 has integral key members 29a. This cap-screw 30 contains a bearing 31 which supports the forward end of the driven shaft 2 and the cap-screw has an integral rearwardly extending skirt which surrounds the forward end of the internally splined element 10 into which the correspondingly splined forward end of the driven shaft 2 extends.

Also mounted on the shafts 28, which support the planetary gears 27, are two pairs of integrally connected gears 32 and 33. These rotate together on the shafts 28, but independently of the gears 27 which are also on these shafts. The larger gears 32 inter-mesh with a rearward integral extension 34 of the sun gear 29 and the gears 33, which are integral with the gears 32, are in mesh with an internal gear 35, which forms part of a casting 36 which in turn is rotatably mounted on a bushing 90 on the hub of the supporting element 10, which surrounds the inner end of the driven shaft 2.

Part of the outer periphery of this casting 36 is finished into the shape of a brake drum and a brake element 37—38 surrounds the same. The brake elements 37—38 are in turn supported on the fixed bracket 7 by means of pins 39. Brake operating links 40, pivots 41 and levers 42 are mounted in the support 7 for tightening the brake band 37 about the brake drum 36, thereby effecting a reverse motion of the driven shaft 2 in an obvious manner.

Figure 6:
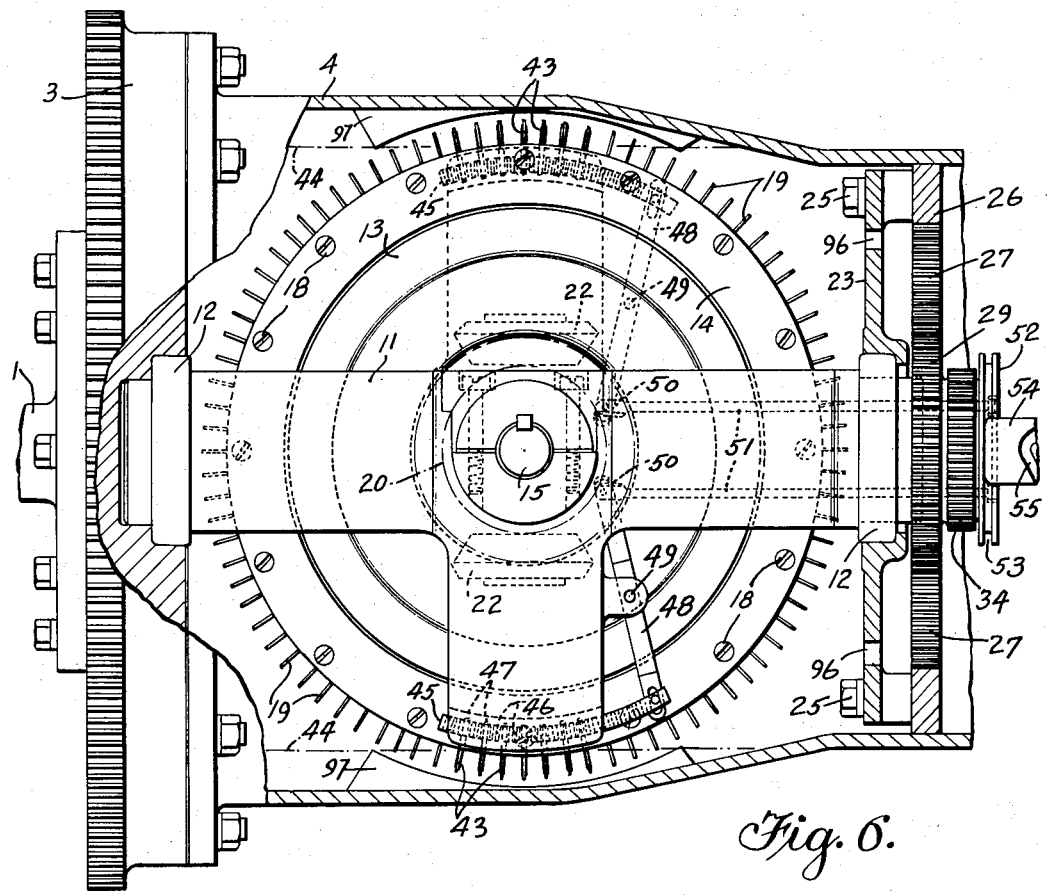
Figure 6 is a horizontal section taken through a portion of Figure 1, looking downwardly.
Figure 7:
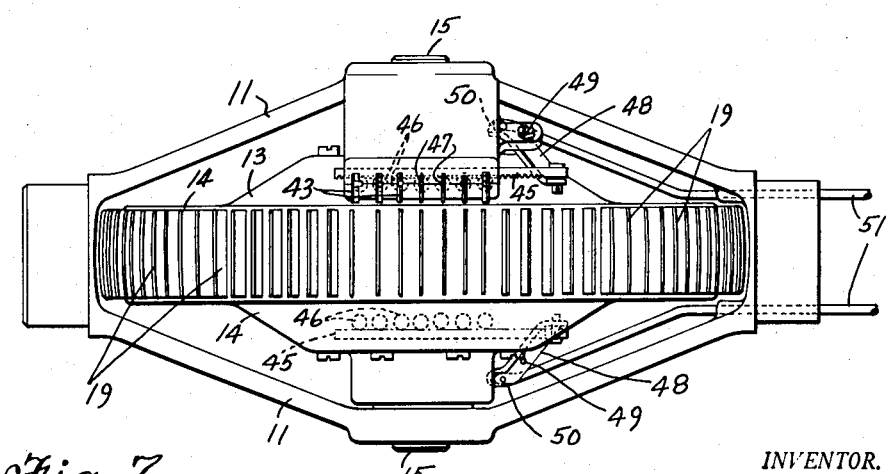
Figure 7 is an end view of the periphery of the outer gyroscopic rotor, showing the actuating vanes and also illustrating the adjustable control vanes.

Mounted on the cage 11 and adjacent the vanes 19, which are fixed on the periphery of the outer gyroscopic rotor 14, are two sets of adjustable control vanes 43 (Figure 7). A quantity of hydraulic fluid is placed in the housing 4 as shown by the reference numeral 44 in Figures 1, 5, 6 and 17, and as the housing 4 is rotated by the driving shaft 1, this hydraulic fluid will, by centrifugal force, completely surround the inner circumference of the housing 4 and will tend to rotate therewith. The fluid will accordingly flow past the adjustable control vanes 43 on the cage 11 and then through the parallel vanes 19 on the rotor 14. So long as these vanes 43 are in positions parallel to the vanes 19, there will be no deflection of the fluid 44 and hence no tendency to rotate the rotors 13 and 14.

However, the vanes 43 are each pivotally mounted at 47 so that they may be turned through an angle from their neutral position, which is shown in Figure 7, and this turning is preferably accomplished by means of a rack 45, which meshes with individual gears 46 mounted on the supporting shafts 47 of the control vanes 43 (Figure 14). Everything is in duplicate, and these racks are moved by control arms 48. When the control vanes 43 are shifted from their neutral position, hydraulic fluid passing therethrough is deflected and will then contact the vanes 19 of the rotor 14 at an angle creating a turbine-like action against the vanes 19 and hence a tendency to rotate the rotors. The angle of deflection of the control vanes 43 can be either automatic or manually changed. This turbine action is further shown somewhat diagrammatically in Figure 15.

Figure 16:
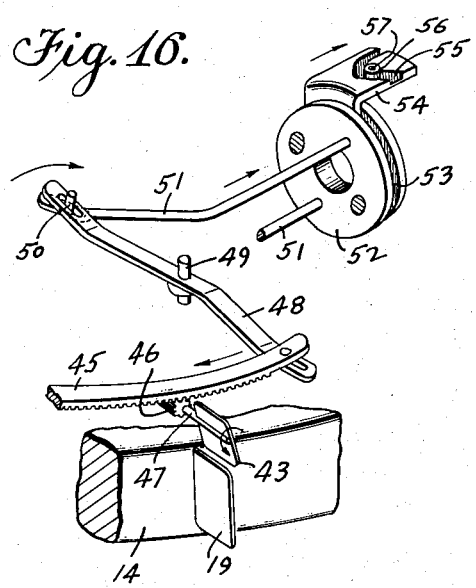
Figure 16 is a perspective view, somewhat foreshortened, showing the main portions of the automatic speed control mechanism.

Referring now to Figure 16, wherein a portion of the mechanism for automatic shifting of the control vanes 43 is presented. The rack 45 is shifted longitudinally by means of its operating lever 48 which is pivoted on a pin 49 fastened on the cage 11 and which has a somewhat loose connection 50 to a link 51. This link 51 is fitted into the face of a disk 52 mounted on the cap-screw 30 (Figure 1). This disk 52 is provided with a peripheral groove 53 in which rides the down turned end or edge of a control plate 54 (Figures 13 and 16). This control plate 54 has a cam groove 55 therein (Figure 13) in which rides a roller 56 mounted on a pin 57, the pin in turn being fitted into a casting or spider 58 (Figures 1, 4 and 12).

This spider 58 is positioned between two plates 59 and 60, the plate 59 being shown in more detail in Figure 8. The plate 59 is integral with the hub element 10 (Figure 9). The plate 60 is fastened into the element 10 by means of bolts 61 and has slots 62 for the passage of the rear ends of the cam plates 54 therethrough. Corresponding slots 62a are formed in the plate 59.

The spider 58 has four arcuate slots 63 therein (Figure 4) and a helical spring 64 is mounted in each of these slots. One end of each spring bears against the end of each slot and the other end of each spring bears against a lug 65, which lugs are integral with the plate 59.

Recesses 66 are provided in the spider 58 for the reception of the corresponding portions of the plates 59 and 60 when the apparatus is assembled.

The spider 58 is provided with four integral webs 67 which extend forwardly to support the shafts 28 as shown in Figure 10 and terminate in supports 68 for these shafts.

Driving pressure between the shafts 1 and 2 is eventually transmitted by way of the springs 64 and the heavier the load, the more compression of the springs. This will tend to shift the rollers 56 in the cam slots 55 and will eventually move the rack 45 and the control vanes 43 by way of the links and levers 48 and 51 and the slotted disk 52. Thus an automatic increase in power is provided whenever there is a load increase.

Rotation of the housing 4 will cause an increasing rotation of the driving fluid 44 and if the control vanes 43 are even at a slight angle to the vanes 19 on the outer gyroscopic rotor, a tendency to rotate the rotors will be apparent. This rotation will obviously be in a plane at right angles to the plane of the section of the housing 4 shown in Figure 1 and about the axis 15. The beveled gears 20 and 22 will move both the rotors, resulting in a proper balancing effect.

At the same time, the housing 4 is rotating about an axis defined by the axes of the shafts 1 and 2 and the internal gear 26 is correspondingly rotated. The planetary gears 27 will be accordingly rotated about the sun gear 29. At the same time, the gyroscopic rotors are rotating about their supporting shaft 15 and any tendency of the sun gear 29 to turn the supporting cage 11 of the gyroscopic rotors will be resisted by the gyroscopic action, wherein the plane of rotation of the same tends to remain fixed. The sun gear will accordingly be rotated at an increasingly higher speed about its own axis and will impart increasing rotation to the driven shaft 2. In the employment of the structure illustrated and described in Figures 12, 13 and 14, the control of this ratio is automatic, depending upon the load.

Rotation of the housing 4 also tends to rotate the planetary gears 27, because they are in mesh with the internal gear 26 fastened to the housing. Part of this driving motion is transmitted to the driven shaft 2 by way of the sun gear 29 and this torque is in the same direction as the rotation tendency imparted through the cage 11 by the gyroscopic action. As the shaft 2, connected to the load, gains momentum, due to the gyroscopic and fluid action on the vanes, the torque required to propel shaft 2 decreases to an amount where the gyroscopic action approaches the moment of greatest efficiency, the planetary gears and the sun gear arrive at such a speed relationship to each other, that when this condition exists, the housing 4 rotates the driven shaft 2 at the same speed. This creates a direct drive between the shafts 1 and 2. The power ratio between the shafts varies automatically as the slippage, due to the gyroscopic action, and when the torque required to drive shaft 2 increases sufficiently to cause gyroscopic action, the power ratio will increase as the torque required increases. An over-drive relationship between the shaft 2 and the driving shaft is also often accomplished by this mechanism.

Figure 20:
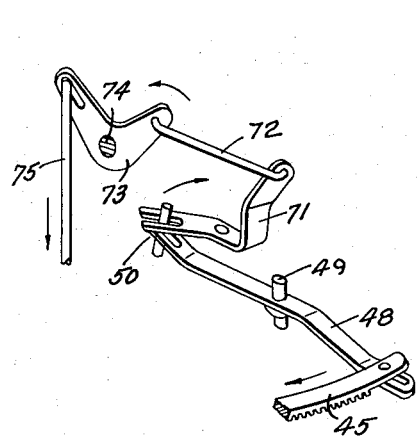
Figure 20 is a perspective view of the means for manually shifting the control vanes as distinguished from the automatic means illustrated in Figure 16.
Figure 18:
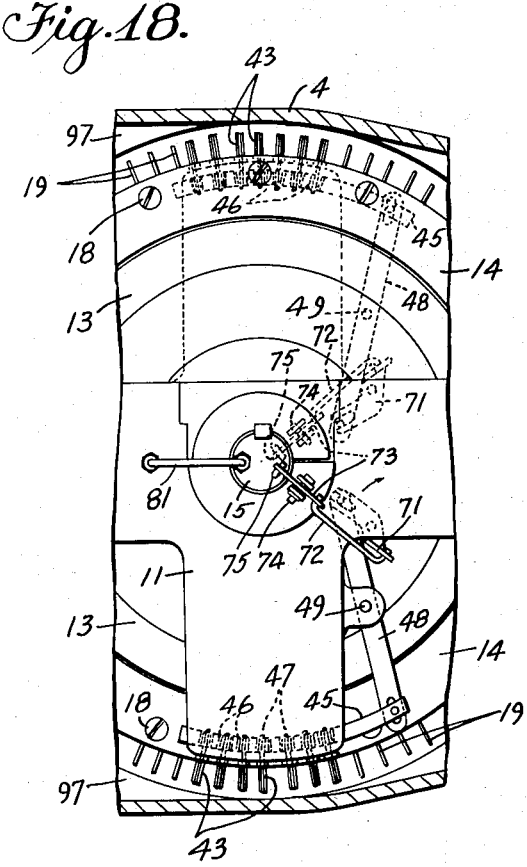
Figure 18 is a further detail of portions of the manual control means and associated parts.

A manual control of the speed and power transmission can be employed, and in this embodiment, the same rack 45 (Figure 20) is used with a control lever 48 pivoted at 49 and a loose connecting pin 50 is provided the same as that shown in Figure 16.

Figure 19:
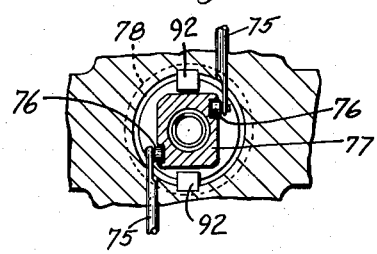
Figure 19 is a detail view of a portion of the valve operating mechanism of Figure 17.
Figure 21:
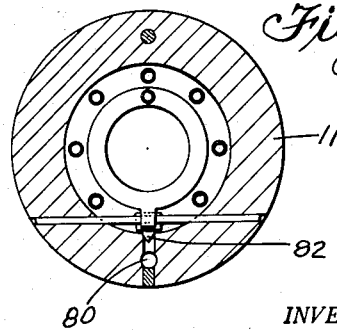
Figure 21 is an enlarged detail view of the valve which forms part of the manual control, taken on the line 21—21 of Figure 17.

The manual control from then on comprises a bent link 71 (Figures 17 and 20) connected by a rod 72 to a bell-crank lever 73, which is pivoted at 74 to the cage 11. A rod 75 thence extends into the center of the cage 11 terminating in a roller 76. As before, there are two sets of these controls, one on each side of the cage 11 (Figure 19). The roller 76 operates in slots in two connected pistons 77, movable in cylinders 78, this being mounted along the axis of rotation of the cage 11 and the housing 4. Guides 92 are provided for the pistons to prevent undesirable rotation in the cylinders. The cylinders 78 are filled at both ends with hydraulic fluid and the pistons are impelled toward the rear cylinder by means of a spring 79. Movement of the pistons in the cylinders is caused by pressure of the hydraulic fluid against the rear piston and this fluid enters the cylinders 78 by way of conduits 80 and 81.

Passage of fluid into the conduits is controlled by way of a needle valve 82 (Figure 17), this in turn being operated by way of an electromagnet 83 by way of wires 84 and 85 leading to a control switch 86 mounted on the dash 87 of the car or some other control panel which may be associated with this or similar mechanism. Further control of the back and forth movement of the hydraulic fluid through the conduits 80 and 81 is effected by means of a spring pressed valve 88, which is part of a piston 93 as best shown in Figure 17. The switch 86 is a two-stage switch as illustrated and this provides an electrically operated pump which can be either operated in an actual pumping manner or a simple locking or holding action by way of the needle valve 82. The switch 86 is moved in and out to provide the pumping action.

In this manner a very positive and accurate adjustment of the control vanes 43 can be accomplished by the operator and this independently of the speed of rotation of the source of power.

It will be evident that herein is provided an infinite ratio selector for transmission of power between a driving and driven shaft which is either automatically or manually controlled and which will provide a predetermined very gradual or a quite rapid application of driving power to a load through a combination of planetary gears and hydraulic and gyroscopic controls, thereby eliminating any undesirable loads on the motive power, regardless of the end load, and furnishing at all times a completely adequate delivery of energy through a practically unlimited range of relative speeds.

Weep-holes 95 are provided in the rims of the gyroscopic rotors in order to prevent unbalance due to undesirable retention of fluid and openings 96 for the passage of lubricant are provided in the case. Vanes 97 are positioned in the housing 4 longitudinally thereof as best illustrated in Figures 5 and 6. These are for the purpose of retaining the fluid 44 in desired relationship to the housing and the vanes 19 and 43 at all times during operation.

Another and similar unit can be employed in heavy trucks or the like for braking purposes. In this event the shaft 2 would act as the driving shaft with corresponding results.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. An infinite variable ratio power transmission mechanism including a driving shaft, a driven shaft, a flywheel housing fixed on the driving shaft, a pair of gyroscopic rotors rotatably mounted within a frame which is rotatably mounted within said housing, peripheral vanes on the rotors, hydraulic and lubricating fluid in the housing adapted to provide fluid coaction between said housing and rotor vanes, a set of bevelled gears drivingly interconnecting said rotors for balanced action and power transmission, a set of sun gears connected to said frame and in mesh with a set of planetary gears which are drivingly engaged with said housing, said planetary gears being rotatably mounted on said driven shaft to thereby provide an operative driving connection between said housing and driven shaft.

2. A device as described in claim 1, wherein means are provided in driving connection with the planetary gears for reversing the direction of rotation of the driven shaft.

3. A device as described in claim 2, wherein said means includes a brake drum and brake band.

4. A device as described in claim 1, wherein control vanes are associated with the peripheral vanes on the gyroscopic rotors.

5. A device as described in claim 4, wherein means are provided for shifting the effective angle of said control vanes.

6. A device as described in claim 5, wherein such shifting means is automatic.

7. A device as described in claim 6, wherein said automatic control is dependent upon the load on the driven shaft.

8. A device as described in claim 5, wherein said control means is manually operated.

9. A device as described in claim 5, wherein said control means includes a gear on each vane, a rack for operating all the gears simultaneously and a series of links and levers for moving the rack.

10. A device as described in claim 9, wherein the last of said link and lever assembly is connected to a piston movable in a cylinder and actuated by hydraulic fluid.

11. A device as described in claim 10, wherein the movement of said fluid is controlled by an electric magnet operating an electric pump.

12. A device as described in claim 9, wherein the last of said links and levers is fixed to a disk, said disk having a peripheral slot therein, a control plate having an edge riding in said slot, a cam for moving the plate and a supporting means for the cam, said supporting means including a portion of the operative connection between the driving an driven shafts.

13. A device as described in claim 12, wherein the said operating driving connection includes a plurality of plates, arcuate slots in one of the plates, springs in said slots and projections on another plate acting against the springs.

14. A device as described in claim 13, wherein one of said plates is indirectly connected to the driving means and the other plate is indirectly connected to the driven means.

References Cited in the file of this patent

UNITED STATES PATENTS

| | | |
|---|---|---|
| 2,223,745 | Stolker | Dec. 3, 1940 |
| 2,453,684 | Cloete | Nov. 9, 1948 |

FOREIGN PATENTS

| | | |
|---|---|---|
| 227,060 | Germany | Oct. 15, 1910 |
| 723,339 | France | Apr. 7, 1932 |